US012586344B2

(12) United States Patent
Li et al.

(10) Patent No.: US 12,586,344 B2
(45) Date of Patent: Mar. 24, 2026

(54) GENERATIVE MODEL FOR MULTI-MODALITY OUTPUTS FROM A SINGLE INPUT

(71) Applicant: Adobe Inc., San Jose, CA (US)

(72) Inventors: Yijun Li, Seattle, WA (US); Zhixin Shu, San Jose, CA (US); Zhen Zhu, Urbana, IL (US); Krishna Kumar Singh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 699 days.

(21) Appl. No.: 17/971,169

(22) Filed: Oct. 21, 2022

(65) Prior Publication Data

US 2024/0135672 A1 Apr. 25, 2024
US 2024/0233318 A9 Jul. 11, 2024

(51) Int. Cl.
*G06V 10/70* (2022.01)
*G06T 11/00* (2006.01)
*G06T 15/08* (2011.01)
*G06V 10/82* (2022.01)
*G06V 20/52* (2022.01)

(52) U.S. Cl.
CPC ............ *G06V 10/70* (2022.01); *G06T 11/001* (2013.01); *G06T 15/08* (2013.01)

(58) Field of Classification Search
USPC ......................................................... 382/158
See application file for complete search history.

(56) References Cited

U.S. PATENT DOCUMENTS

| | | | | |
|---|---|---|---|---|
| 11,107,228 | B1 * | 8/2021 | Shrivastava | ............ G06T 11/00 |
| 2017/0365038 | A1 * | 12/2017 | Denton | ..................... G06T 5/60 |
| 2019/0294931 | A1 * | 9/2019 | Risser | .................... G06N 3/084 |
| 2021/0241032 | A1 * | 8/2021 | Wang | ................... G06V 30/153 |

(Continued)

OTHER PUBLICATIONS

Y. Zhao, R. Wu, and H. Dong, "Unpaired Image-to-Image Translation using Adversarial Consistency Loss," Jan. 18, 2021, Hyperplane Lab, CFCS, Computer Science Dept., Peking University, Peng Cheng Lab, Version 7, https://doi.org/10.48550/arXiv.2003.04858,. (Year: 2021).*

(Continued)

*Primary Examiner* — Chineyere Wills-Burns
(74) *Attorney, Agent, or Firm* — FIG. 1 Patents

(57) ABSTRACT
An image generation system implements a multi-branch GAN to generate images that each express visually similar content in a different modality. A generator portion of the multi-branch GAN includes multiple branches that are each tasked with generating one of the different modalities. A discriminator portion of the multi-branch GAN includes multiple fidelity discriminators, one for each of the generator branches, and a consistency discriminator, which constrains the outputs generated by the different generator branches to appear visually similar to one another. During training, outputs from each of the fidelity discriminators and the consistency discriminator are used to compute a non-saturating GAN loss. The non-saturating GAN loss is used to refine parameters of the multi-branch GAN during training until model convergence. The trained multi-branch GAN generates multiple images from a single input, where each of the multiple images depicts visually similar content expressed in a different modality.

20 Claims, 7 Drawing Sheets

(56) References Cited

U.S. PATENT DOCUMENTS

| | | | | |
|---|---|---|---|---|
| 2021/0335029 A1* | 10/2021 | Kowalski | ............... | G06T 11/60 |
| 2022/0108417 A1* | 4/2022 | Liu | .......................... | G06F 40/30 |
| 2022/0180975 A1* | 6/2022 | Regev | .................... | G16B 40/30 |
| 2022/0188987 A1* | 6/2022 | Kim | .......................... | G06T 5/70 |
| 2022/0262106 A1* | 8/2022 | Khoreva | ............... | G06V 10/82 |

OTHER PUBLICATIONS

Bora, Ashish , et al., "AmbientGAN: Generative models from lossy measurements", ICLR 2018 Conference Blind Submission [retrieved Aug. 26, 2022]. Retrieved from the Internet <https://www.cs.utexas.edu/~ecprice/papers/ambientgan.pdf>., Feb. 2018, 22 Pages.

Eigen, David , et al., "Depth Map Prediction from a Single Image using a Multi-Scale Deep Network", Advances in heural information processing systems, 2014 [retrieved Aug. 26, 2022]. Retrieved from the Internet <https://citeseerx.ist.psu.edu/viewdoc/download?doi=10.1.1.749.9954&rep=rep1&type=pdf>., Jun. 9, 2014, 9 pages.

Guo, Yu , et al., "MaterialGAN: Reflectance Capture using a Generative SVBRDF Model", Cornell University arXiv, arXiv.org [retrieved Aug. 26, 2022]. Retrieved from the Internet <https://arxiv.org/pdf/2010.00114.pdf>., Sep. 30, 2020, 13 Pages.

Heusel, Martin , et al., "GANs Trained by a Two Time-Scale Update Rule Converge to a Local Nash Equilibrium", NIPS'17: Proceedings of the 31st International Conference on Neural Information Processing Systems [retrieved Sep. 7, 2022]. Retrieved from the Internet <https://proceedings.neurips.cc/paper/2017/file/8a1d694707eb0fefe65871369074926d-Paper.pdf>., Jan. 12, 2018, 12 pages.

Karras, Tero , et al., "Alias-Free Generative Adversarial Networks", Cornell University arXiv, arXiv.org [retrieved Aug. 26, 2022]. Retrieved from the internet <https://arxiv.org/pdf/2106.12423.pdf>., Oct. 18, 2021, 31 Pages.

Karras, Tero , et al., "Analyzing and Improving the Image Quality of StyleGAN", Cornell University arXiv, arXiv.org [retrieved Aug. 26, 2022]. retrieved from the Internet <https://arxiv.org/pdf/1912.04958.pdf>., Dec. 2019, 21 Pages.

Karras, Tero , et al., "Training Generative Adversarial Networks with Limited Data", Cornell University arXiv, arXiv. org [retrieved Oct. 3, 2022]. Retrieved from the Internet <https://arxiv.org/pdf/2006.06676.pdf>., Oct. 7, 2020, 37 Pages.

Shi, Zifan , et al., "3D-Aware Indoor Scene Synthesis with Depth Priors", Cornell University arXiv, arXiv.org [retrieved Aug. 26, 2022]. Retrieved from the Internet <https://arxiv.org/pdf/2202.08553.pdf>., Feb. 18, 2022, 14 Pages.

Zhang, Yuxuan , et al., "DatasetGAN: Efficient Labeled Data Factory with Minimal Human Effort", Cornell University arXiv, arXiv.org [retrieved Aug. 26, 2022]. Retrieved from the Internet <https://arxiv.org/pdf/2104.06490.pdf>., Apr. 20, 2021, 11 Pages.

Zhao, Shengyu , et al., "Differentiable Augmentation for Data-Efficient GAN Training", Cornell University arXiv, arXiv.org [retrieved Oct. 3, 2022]. Retrieved from the Internet <https://arxiv.org/pdf/2006.10738.pdf>., Dec. 7, 2020, 23 Pages.

* cited by examiner

500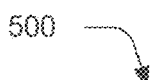

> 502
> Receive an input that includes a latent space code
> representing an image in an embedding space > 504
> Generate a plurality of different images from the input using a generative
> adversarial network (GAN) machine learning model
>
> > 506
> > Cause a plurality of shallow layers of a generator portion of the GAN machine
> > learning model to generate a shared output based on the input
>
> > 508
> > Cause each of a plurality of different branches of the generator portion of the
> > GAN machine learning model to generate one of the plurality of different
> > images based on the shared output > 510
> Output the plurality of different images

Figure 6:
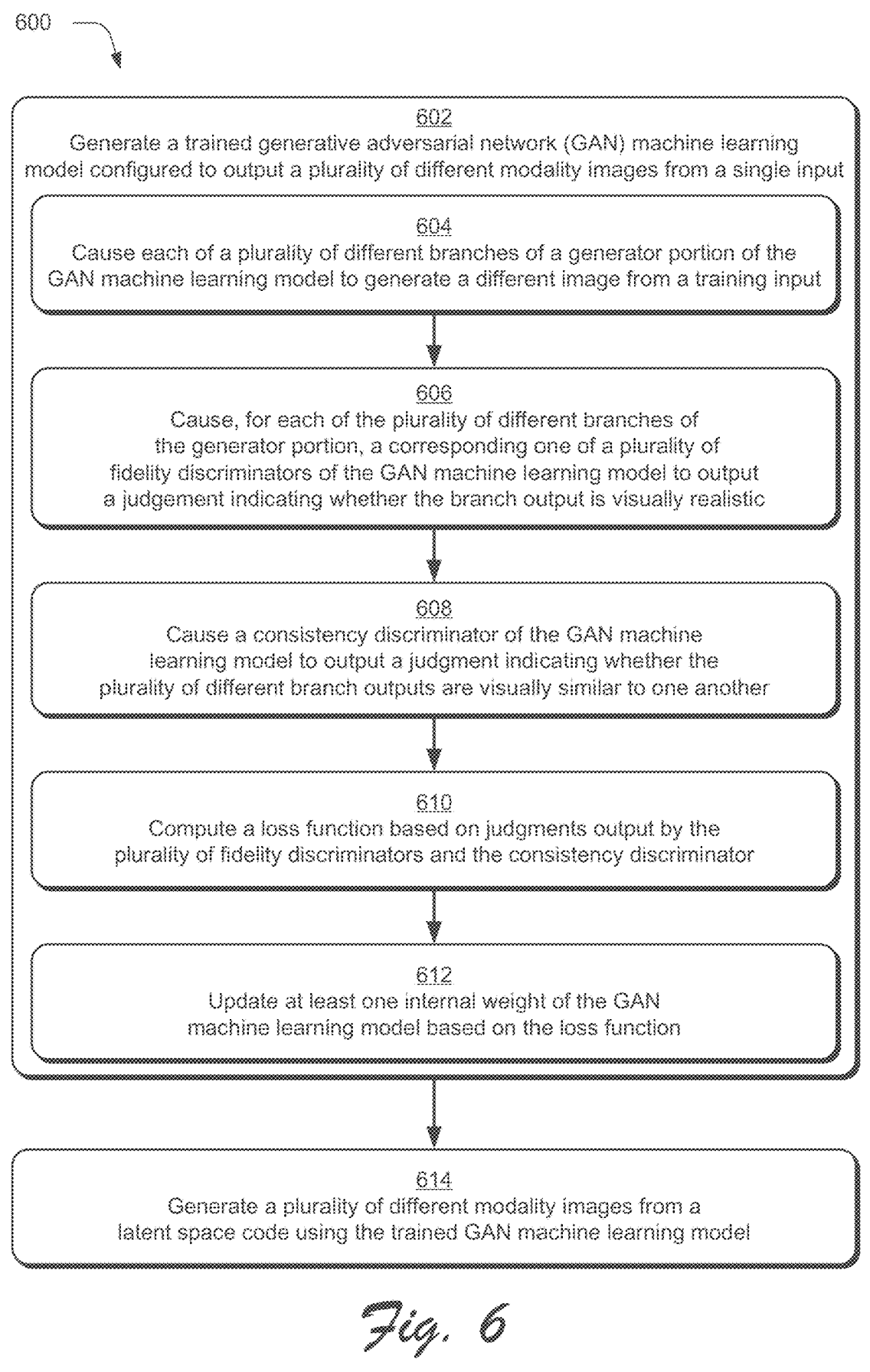

602
Generate a trained generative adversarial network (GAN) machine learning model configured to output a plurality of different modality images from a single input

604
Cause each of a plurality of different branches of a generator portion of the GAN machine learning model to generate a different image from a training input

606
Cause, for each of the plurality of different branches of the generator portion, a corresponding one of a plurality of fidelity discriminators of the GAN machine learning model to output a judgement indicating whether the branch output is visually realistic

608
Cause a consistency discriminator of the GAN machine learning model to output a judgment indicating whether the plurality of different branch outputs are visually similar to one another

610
Compute a loss function based on judgments output by the plurality of fidelity discriminators and the consistency discriminator

612
Update at least one internal weight of the GAN machine learning model based on the loss function

614
Generate a plurality of different modality images from a latent space code using the trained GAN machine learning model

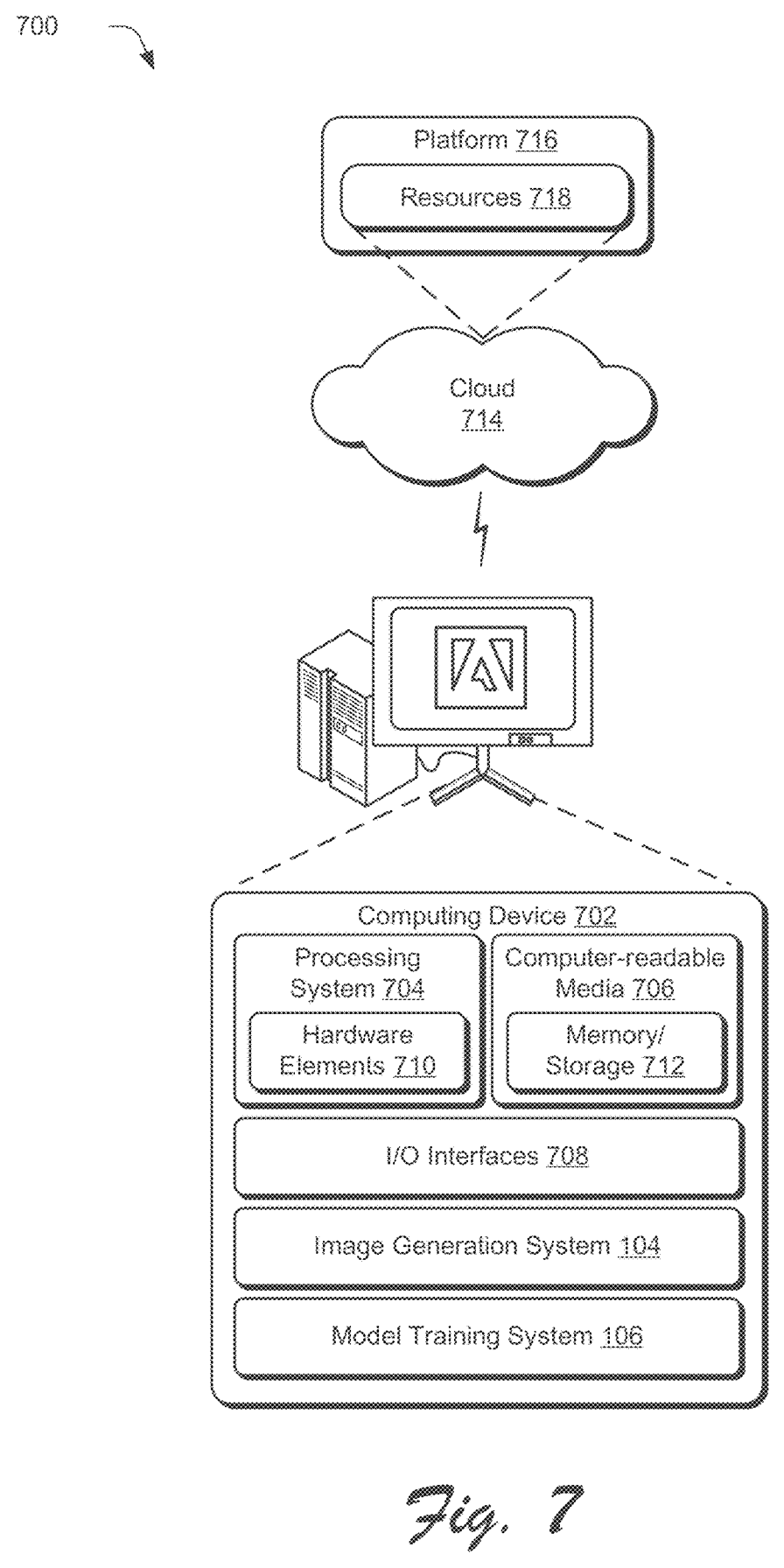

Platform 716

Resources 718

Cloud
714

Computing Device 702

Processing System 704

Hardware Elements 710

Computer-readable Media 706

Memory/ Storage 712

I/O Interfaces 708

Image Generation System 104

Model Training System 106

*Fig. 7*

GENERATIVE MODEL FOR MULTI-MODALITY OUTPUTS FROM A SINGLE INPUT

BACKGROUND

A common task in digital image generation is generating multiple images that depict visually similar scenes or environments, expressed in different modalities. For instance, some approaches for digitally rendering a three-dimensional digital environment rely on multiple digital images that each express the environment in a different modality to do so, such as one image that depicts visual characteristics (e.g., colors) of the environment as perceived by a human viewer, another image that represents depth characteristics of different points in the environment, another image that identifies segmentation boundaries for different objects in the environment, and so forth. Conventional image generation systems, however, are unable to generate these multiple modality images for the environment using a single generative model.

SUMMARY

An image generation system is described that implements a multi-branch GAN to generate multiple images that each depict visually similar content expressed in a different modality. The multi-branch GAN includes a generator portion and a discriminator portion, with the generator portion including multiple branches that are each tasked with generating a different modality output. By being tasked with these different objectives, the generator branches each produce an image that depicts a common environment expressed in a different modality from images produced by other generator branches.

The multi-branch GAN includes multiple discriminators in the discriminator portion. The discriminator portion includes a plurality of fidelity discriminators, one for each of the multiple branches included in the generator portion. Each fidelity discriminator constrains an output of a corresponding generator branch to produce a realistic representation for the modality that the corresponding generator branch is tasked with producing. In addition to the plurality of fidelity discriminators, the discriminator portion of the multi-branch GAN includes a consistency discriminator, which constrains the outputs generated by the different generator branches to appear visually similar to one another.

During training of the multi-branch GAN, outputs from each of the fidelity discriminators and the consistency discriminator are used to compute a non-saturating GAN loss. The non-saturating GAN loss is used to refine parameters of the multi-branch GAN during training until model convergence. Upon convergence, the multi-branch GAN is useable by the image generation system to generate multiple images from a single input, where each of the multiple images expresses a common environment in a different modality.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

FIG. 5 is a flow diagram depicting a procedure in an example implementation of generating a plurality of different images from a single input using the multi-branch GAN implemented by the image generation system of FIG. 1 using the techniques described herein.

FIG. 6 is a flow diagram depicting a procedure in an example implementation of training a multi-branch GAN and using the trained multi-branch GAN to generate a plurality of different modality images from a single input using the techniques described herein.

FIG. 7 illustrates an example system including various components of an example device to implement the techniques described with reference to FIGS. 1-6.

DETAILED DESCRIPTION

Figure 1:
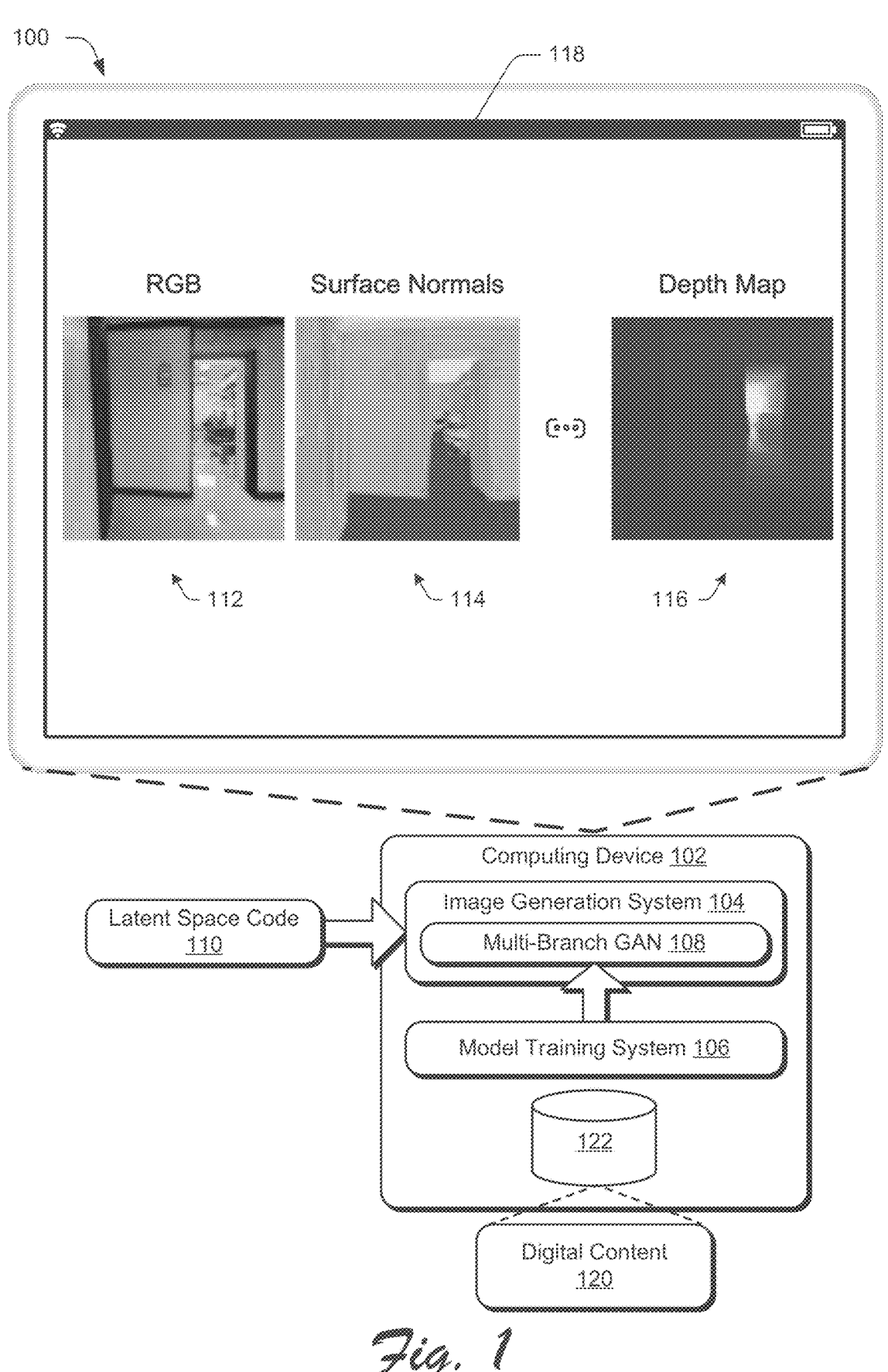
FIG. 1 is an illustration of a digital medium environment in an example implementation that is operable to employ an image generation system for generating different modality images from a single input and a model training system configured to generate multi-branch GAN machine learning model employed by the image generation system.

With advances in computing device technology, generative models are increasingly used as tools to perform digital image generation. Generative models such as generative adversarial networks (GANs) are conventionally trained for a single objective, such that a dedicated model is trained for a specific task. For example, consider an image generation scenario where the objective is to generate a first image that depicts an environment as would be visually observed by a human eye, generate a second image that represents a depth map for the environment depicted in the first image, and generate a third image that provides a segmentation map denoting different objects included in the environment. Using conventional generative models, achieving the objective of this example image generation scenario requires using multiple GANs—one model trained to generate a red-green-blue (RGB) or other color space image that depicts content as would be observed by the human eye, another model trained to generate a depth map image, and yet another model trained to generate a segmentation map image.

Continuing this example scenario, there are inherently different training data and training procedures required to train the different models used to generate the RGB, depth map, and segmentation map images. Given these differences, conventional digital image generation approaches are unable to generate different images in a visually cohesive manner from a common input. For instance, different training data causes different models to learn different latent spaces, such that an input code representing a point in latent space for one generative model is unlikely to correspond to visually similar image data for the same point represented in a different latent space. In this manner, continuing the example scenario from above, if tasked with generating a respective output image from a common latent space code input, the conventional generative models are likely to generate an RGB image that depicts different content than a depth map image, which similarly depicts different content than a segmentation map image.

To address this problem, conventional image generation approaches often use a first model to generate a RGB image depicting an environment and subsequently input the RGB image generated by the first model to different downstream models. For instance, continuing the example scenario, the RGB image output by the first model is input to a second model configured to output a depth map image and also input to a third model configured to output a segmentation map image in order to generate images that depict visually similar content in different modalities. While this workaround achieves the example scenario objective of generating multiple modality images that depict visually similar content, it still requires that separate generative models be trained for a specific task (e.g., generating a single modality image) and is unable to generate the multiple modality images from a single input. Consequently, conventional approaches require significant computational resources and time to train each of the different generative models, and waste time by relying on the output of one model for input to other models, thus introducing latency into the digital image generation process.

To address these conventional shortcomings, an image generation system is described that implements a multi-branch GAN configured to generate, from a single input, multiple images that each depict visually similar content (e.g., a common environment) expressed in a different modality. The multi-branch GAN includes a generator portion and a discriminator portion, with the generator portion including multiple branches that are each configured to generate a different modality output. In an image generation context, shallower layers of a GAN's generator portion generally output coarse structures of a scene or environment to be depicted in a final output image after processing by deeper layers of the generator portion. To ensure that the different modality images output by the multi-branch GAN depict common geometries and other visual characteristics in a visually cohesive manner, the multi-branch GAN is configured with a generator portion architecture that processes an input using a single set of shallow layers before branching out to deeper layers. Each branch in the generator portion includes an architectural copy of the deeper layers included in other branches and is tasked with a different objective to generate an image from an output of the shared shallow layers. By being tasked with these different objectives, the generator portion branches each produce an image that depicts a shared scene expressed in a different modality from other generator portion branches.

The multi-branch GAN is further configured with an architecture that includes multiple discriminators in the discriminator portion. The discriminator portion includes a plurality of fidelity discriminators, one for each of the multiple branches included in the generator portion. During training, each fidelity discriminator is configured to assess an output produced by a corresponding generator branch and provide a judgment indicating whether the output is real or fake using ground truth training data for the respective image modality. In addition to the plurality of fidelity discriminators, the discriminator portion of the multi-branch GAN includes a consistency discriminator.

During training, the consistency discriminator receives as input the concatenated outputs produced by the plurality of generator portion branches and generates a judgment indicating whether the respective generator branch outputs are visually consistent with one another. Judgments output by each of the fidelity discriminators and the consistency discriminator are used to compute a non-saturating GAN loss, which is used to refine parameters (e.g., internal weights) of the multi-branch GAN during training until model convergence. Upon convergence, the multi-branch GAN is useable by the image generation system to generate multiple images from a single input, where each of the multiple images expresses a common scene or environment in a different modality. The techniques described herein advantageously reduce latency involved with generating multiple modality images and only a single GAN with a single input. Further, the techniques described herein produce different modality images for a RGB image that exhibit better alignment and higher quality relative to conventional approaches that use different generative models to process the RGB image as input and generate different modality outputs, such as depth map estimators, segmentation map estimators, and so forth.

Term Examples

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "image modality" refers to a particular mode in which image data is expressed. For instance, different image modalities of an environment express the same environment using different image representations. For instance, three different example image modalities for an environment include a first image that depicts an environment as would be visually observed by a human eye, a second image that represents a depth map for the environment depicted in the first image, and a third image that provides a segmentation map denoting different objects included in the environment As used herein, the term "fidelity discriminator" refers to a component of a discriminator portion of a generative adversarial network (GAN) machine learning model that constrains an output of a corresponding branch of a generator portion of the GAN machine learning model to produce a realistic representation for the image modality that the corresponding generator branch is tasked with producing.

As used herein, the term "consistency discriminator" refers to a component of a discriminator portion of a GAN machine learning model that constrains output images generated by different branches of a generator portion of the GAN machine learning model to appear visually similar to one another.

As used herein, the term "latent space code" refers to an input that specifies one or more data points in an embedding space (e.g., a Gaussian normal distribution). The latent space (e.g., the embedding space) represents image features as data points positioned within the latent space, where data points positioned closer to one another indicate similarities between the image features represented by the corresponding data points. Conversely, data points positioned further from one another in the latent space represent dissimilar image features. The latent space code represents a random sampling of data points from the embedding space (e.g., a random sampling of points from a Gaussian normal distribution).

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by a business to perform operations "over the cloud."

The computing device 102 is illustrated as including an image generation system 104 and a model training system 106. The image generation system 104 is representative of functionality that implements a GAN having multiple branches in a generator portion, such as the multi-branch GAN 108 depicted in FIG. 1. Using the multi-branch GAN 108, the image generation system 104 is configured to generate, from a single latent space code 110, a plurality of different images, where each of the plurality of different images expresses similar visual content in a different modality.

As described herein, the latent space code 110 refers to an input that specifies one or more data points in an embedding space (e.g., a Gaussian normal distribution). The latent space (e.g., the embedding space) represents image features as data points positioned within the latent space, where data points positioned closer to one another indicate similarities between the image features represented by the corresponding data points. Conversely, data points positioned further from one another in the latent space represent dissimilar image features. The latent space code 110 represents a random sampling of data points from the embedding space (e.g., a random sampling of points from a Gaussian normal distribution). In some implementations, the latent space code 110 is determined based on an input image (not depicted). For example, the image generation system 104 is configured to implement an image classification model that is pretrained to generate a latent space code for an input image. Alternatively or additionally, the latent space code 110 is generated randomly using known techniques (e.g., generated using a normal distribution sampler).

Training of the multi-branch GAN 108 by the model training system 106 is described in further detail below with respect to FIG. 4. As depicted in FIG. 1, in some implementations the model training system 106 is implemented by the computing device 102 to generate the multi-branch GAN 108. Alternatively or additionally, in some implementations the model training system 106 is implemented by a computing device other than the computing device 102 and the trained multi-branch GAN 108 is received by the computing device 102 from the other computing device.

The plurality of different images produced by the multi-branch GAN 108 are thus constrained to depict visual content identified by the latent space code 110. As described in further detail below, the architectural design of the multi-branch GAN 108 further ensures that the plurality of different images generated from the latent space code 110 depict visually similar content while also each representing the depicted content in a different modality. For instance, in the illustrated example of FIG. 1, the multi-branch GAN 108 is depicted as generating image 112, image 114, and image 116 from the latent space code 110. Although depicted as generating three different images, the illustrated example of FIG. 1 is not intended to be limiting, and the multi-branch GAN 108 is useable to generate any number of different images from the latent space code 110, as indicated by the ellipses between image 114 and image 116.

The image 112, the image 114, and the image 116 each depict a common environment which, in the illustrated example of FIG. 1, is an environment of an indoor setting observed from a hallway with a view into a room via an open door in the hallway. As indicated by corresponding captions output via the display 118 in association with the image 112, the image 114, and the image 116, the images are generated by the multi-branch GAN 108 to depict the common environment while representing the common environment in a different modality. For instance, the image 112 is generated to depict a RGB representation of the common environment, the image 114 is generated to depict surface normal of the common environment, and the image 116 is generated to depict a depth map for the common environment. The RGB representation of the image 112 thus provides a depiction of the illustrated common environment as would be observed by a human viewer located in the common environment.

The surface normal representation of the image 114 provides a visual representation indicating a normal (e.g., a line, ray, vector, and the like) perpendicular to a point in the depicted environment, for each point in the common environment. To achieve the visual representation depicted in image 114, the normal vectors for each discrete image region (e.g., pixel) is mapped to a color space value using known techniques. In this manner, the modality expressed by the image 114 is useable to represent segmentations between different objects depicted in the common environment and distinguishes from the RGB representation of the environment as provided by image 112.

The depth map representation of the image 116 provides a visual representation of information indicating distances between different surfaces depicted in the common environment and a viewpoint (e.g., a theoretical camera that might be used to capture the image 112). In this manner, the modality of the common environment expressed by the image 116 distinguishes from both the RGB representation of the environment as provided by image 112 as well as the surface normal representation of the environment as provided by image 114. Although described herein and illustrated with respect to generating specific types of different image modalities from the single latent space code 110, the techniques described herein are not so limited to the example types of modalities. For instance, other image modalities include segmentation maps, edge maps, layout maps, and so forth.

The multi-modality images (e.g., image 112, image 114, and image 116) generated by the image generation system 104 are each representative of digital content 120 maintained in storage 122 of the computing device 102. Alternatively or additionally, one or more of the multi-modality images generated by the image generation system 104 are representative of digital content 120 maintained in storage of a different computing device (e.g., a computing device communicatively coupled to the computing device 102). The storage 122 is further representative of a storage device configured to maintain data useable for training the multi-branch GAN 108. For instance, in some implementations the storage 122 includes training data for training the multi-branch GAN 108, examples of which are described in further detail below with respect to FIG. 4.

Having considered an example digital medium environment, consider now a discussion of example systems useable to generate a trained multi-branch GAN and output multiple images from a single input that each represent a different modality using the trained multi-branch GAN.

Image Generation and Model Training Systems

Figure 2:
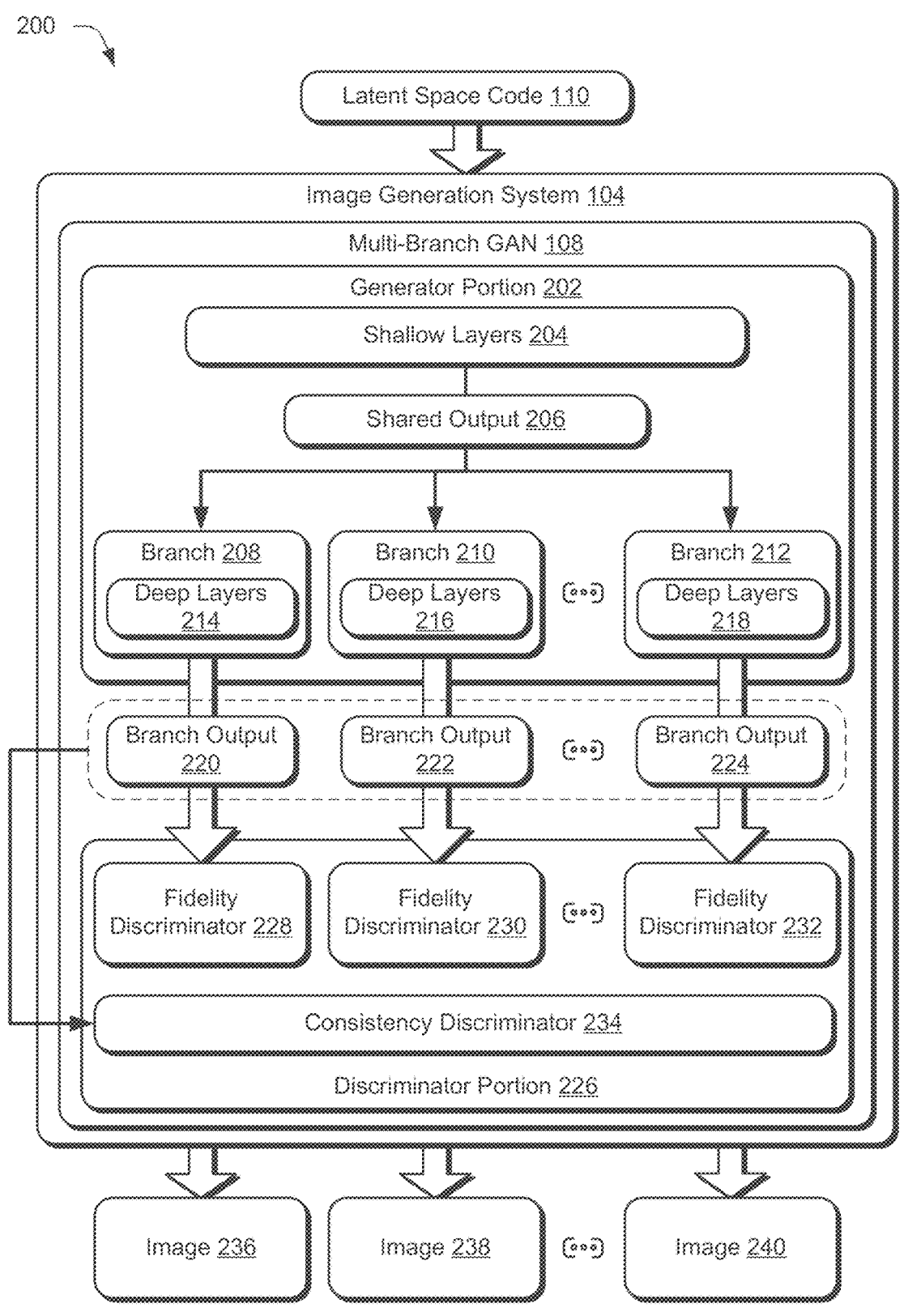
FIG. 2 depicts a digital medium 200 showing operation of the image generation system of FIG. 1 generating multiple images that each represent a different modality using a multi-branch GAN.

FIG. 2 depicts a digital medium environment 200 showing operation of the image generation system 104 generating multiple images that each represent a different modality using a multi-branch GAN 108.

Figure 3:
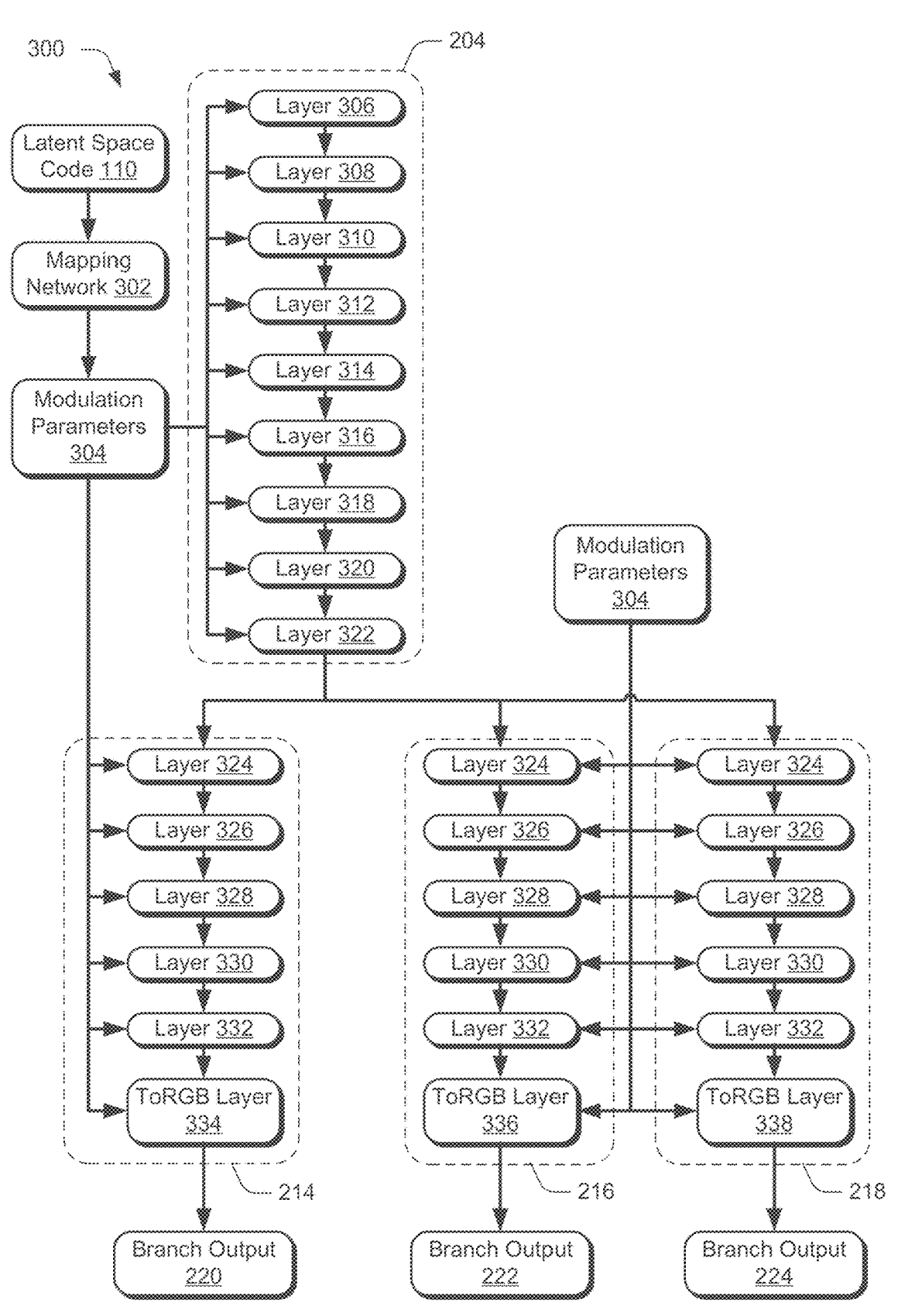
FIG. 3 depicts a digital medium environment showing an architecture of a generator portion of the multi-branch GAN implemented by the model training system of FIG. 1.

FIG. 3 depicts a digital medium environment 300 showing an architecture of a generator portion of the multi-branch GAN 108 implemented by the model training system 106 to perform techniques described herein.

Figure 4:
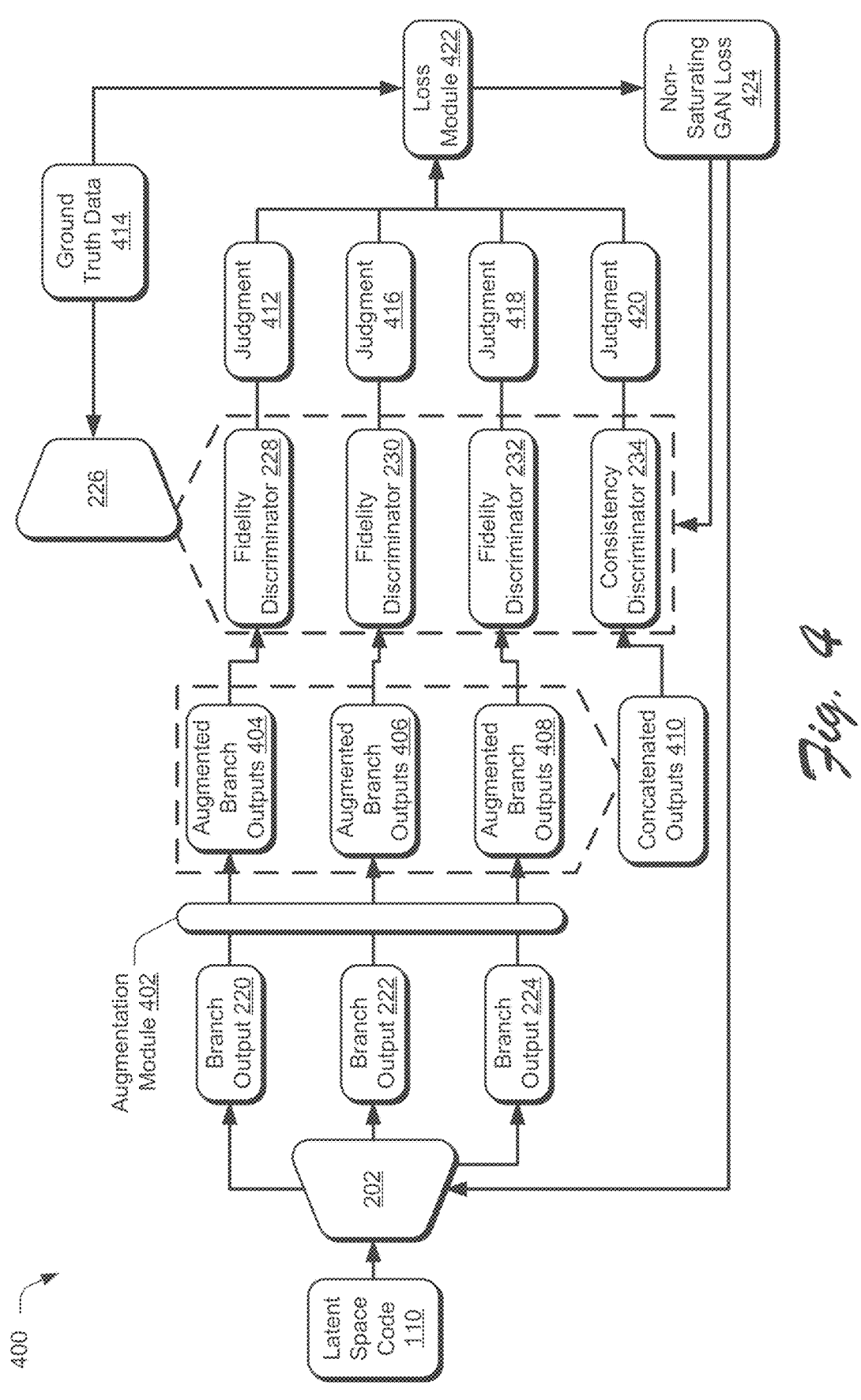
FIG. 4 depicts a digital medium environment showing operation of the model training system of FIG. 1 in training the multi-branch GAN implemented by the image generation system of FIG. 1.

FIG. 4 depicts a digital medium environment 400 showing operation of the model training system 106 in training the multi-branch GAN 108.

As illustrated in FIG. 2, the image generation system 104 receives a latent space code 110 and provides the latent space code 110 as input to the multi-branch GAN 108. The multi-branch GAN 108 is trained, as described in further detail below, to generate different-modality images from the latent space code 110 by first processing the latent space code 110 using a generator portion 202 of the multi-branch GAN 108. The generator portion 202 is configured as including a plurality of shallow layers 204. The shallow layers 204 are configured to process the latent space code 110 and generate a shared output 206 that is subsequently provided as input to deeper layers of the generator portion 202 for use in generating the multiple, different modality images.

The digital medium environment 300 of FIG. 3 illustrates an architecture of the generator portion 202 in greater detail. As depicted in FIG. 3, the generator portion 202 initially processes the latent space code 110 using a mapping network 302 to generate modulation parameters 304. The modulation parameters 304 are provided as input to each layer in the generator portion 202, thereby controlling modulation of convolutional kernels in the generator portion 202 based on the specific latent space code 110 provided as input to the multi-branch GAN 108. In implementations, the mapping network 302 is configured as a mapping network included in a StyleGAN3 generator, as described by Karras et al. in "Alias-Free Generative Adversarial Networks," the disclosure of which is hereby incorporated by reference.

Given the modulation parameters 304, the generator portion 202 provides the modulation parameters 304 as input to a first one of the shallow layers 204, which is represented by layer 306 in the illustrated example of FIG. 3. In some implementations, the generator portion 202 performs additional processing on the modulation parameters 304 (not depicted) and provides a result of the additional processing as input to the layer 306. For instance, in some implementations the generator portion 202 processes the modulation parameters 304 in the manner described by Karras, et al. when processing the intermediate latent code w for input to layer $L_0$. Each layer in the generator portion, given its respective inputs, is configured to perform convolutions, nonlinearities, upsampling, and noise introduction, which enables a sequence of generator portion 202 layers to generate an output image representing the latent space code 110 using a given modality. For instance, each of the layers included in the generator portion 202 are configured as layers included in the StyleGAN3 generator described by Karras, et al.

The shallow layers 204 of the generator portion 202 thus include layer 306, layer 308, layer 310, layer 312, layer 314, layer 316, layer 318, layer 320, and layer 322, as depicted in the illustrated example of FIG. 3. In this manner, an output generated by the layer 306 is provided as input to the layer 308. Outputs from previous layers are subsequently provided as inputs by subsequent layers in the sequence of shallow layers 204. As noted above, each layer is modulated by the modulation parameters 304. Although described and illustrated as including nine layers in sequence, the generator portion 202 is configured to implement any number of layers in the shallow layers 204. The output of the final layer in the sequence of shallow layers 204 (e.g., the output of layer 322) represents a shared output 206 to be provided as input to different branches of the generator portion 202, where each branch includes a sequence of deeper layers for the generator portion 202.

For instance, in the illustrated example of FIG. 2, the generator portion 202 is depicted as including three branches: branch 208, branch 210, and branch 212. Although depicted and described herein as including three different branches, the generator portion 202 of the multi-branch GAN 108 is configured to include any number of multiple branches (e.g., two or more branches), as indicated by the ellipses between branch 210 and branch 212. Each branch of the generator portion 202 is configured to generate an image representation of the latent space code 110, expressed in a different modality than images generated by other branches of the generator portion 202.

To do so, each branch includes a plurality of deep layers of the generator portion 202 that process shared output 206 to generate a branch output. For instance, in the illustrated example of FIG. 2, branch 208 includes deep layers 214, branch 210 includes deep layers 216, and branch 212 includes deep layers 218. The deep layers of each branch process the shared output 206 to generate a respective branch output. For instance, branch 208 processes the shared output 206 to generate branch output 220, branch 210 processes the shared output 206 to generate branch output 222, and branch 212 processes the shared output 206 to generate branch output 224. Each set of deep layers included in the different generator portion 202 branches are comprised of layers including structures identical to one another, except for a final ToRGB layer that is configured to generate a RGB image depicting features of a corresponding modality for the branch (e.g., a RGB image depicting depth map features, a RGB image depicting surface normal features, and so forth).

As depicted in FIG. 3, each of the deep layers 214, deep layers 216, and deep layers 216 includes a sequence of layers having identical structures, specifically the sequence of layer 324, layer 326, layer 328, layer 330, and layer 332. Layer 324, layer 326, layer 328, layer 330, and layer 332 each are configured to process, as input, an output generated by a previous layer in the sequence. Similar to the shallow layers 204, processing of each of the deep layers is modulated using the modulation parameters 304. For instance, layer 324 is configured to receive the shared output 206 from layer 332 and generate an output subject to modulation by the modulation parameters 304. The output generated by layer 324 is then provided as input to layer 326, which generates an output provided as input to layer 328, and so forth. Each generator portion 202 branch includes a final layer in its sequence of deep layers that is configured to generate a RGB image depicting features of a corresponding modality for the branch. For instance, the deep layers 214 of branch 208 include a ToRGB layer 334, deep layers 216 of branch 210 include a ToRGB layer 336, and deep layers 218 of branch 212 include a ToRGB layer 338.

In implementations where the multi-branch GAN 108 is a fully trained model, the outputs generated by each generator portion branch are output as the multiple different modality images generated from the single latent space code 110 by the image generation system 104. For instance, the branch output 220 generated by the ToRGB layer 334 of branch 208 is output as image 236, the branch output 222 output by the ToRGB layer 336 of branch 210 is output as image 238, and the branch output 224 generated by the ToRGB layer 338 of branch 212 is output as image 240. As an example, image 236 is representative of image 112, image 238 is representative of image 114, and image 240 is representative of image 116, as described above with respect to FIG. 1.

To ensure that the images generated by different ones of the generator portion 202 branches represent different modalities, the multi-branch GAN 108 includes a discriminator portion 226. The discriminator portion 226 includes a plurality of different fidelity discriminators, one for each of the plurality of branches of the generator portion. For instance, in the illustrated example of FIG. 2, the discriminator portion 226 includes a fidelity discriminator 228 for branch 208, a fidelity discriminator 230 for branch 210, and a fidelity discriminator 232 for branch 212. The fidelity discriminators are each configured to ensure that the branch output generated by a corresponding branch represents a realistic image for the modality. To do so, different fidelity discriminators are trained using training data from different domains, as described in further detail below with respect to FIG. 4. In addition to including one fidelity discriminator for each branch of the generator portion 202, the discriminator portion 226 includes a consistency discriminator 234. The consistency discriminator 234 represents functionality of the multi-branch GAN 108 to ensure that the branch outputs generated by the different branches of the generator portion 202 depict image content that is visually similar to one another. To ensure that branch outputs generated by different generator portion branches from a single latent space code 110 depict visually similar content (e.g., depict the same environment represented in different modalities), the consistency discriminator 234 is trained to output a judgment indicating whether generator branch outputs are visually similar, given an input of the concatenated branch outputs. For a further description of training the multi-branch GAN 108, consider FIG. 4.

FIG. 4 depicts a digital medium environment 400 in which the model training system 106 generates a trained instance of the multi-branch GAN 108. Specifically, the illustrated example represents operations performed during a single training iteration and the model training system 106 is configured to perform the operations described with respect to FIG. 4 for as many training iterations as necessary until the multi-branch GAN 108 converges (e.g., until the generator branch outputs achieve a threshold difference to ground truth training data). In the illustrated example of FIG. 4, the multi-branch GAN 108 is configured as having the generator portion 202 branches and discriminators of the discriminator portion 226 as described above with respect to FIG. 3.

To begin training the multi-branch GAN 108, the model training system 106 provides a first latent space code 110 as input to the generator portion 202, which causes the generator portion 202 to generate branch output 220, branch output 222, and branch output 224. In some implementations, such as scenarios where limited training data is available to the model training system 106, the model training system 106 implements an augmentation module 402 to augment the outputs generated by each branch of the generator portion 202. For instance, the augmentation module 402 processes the branch output 220 to generate augmented branch outputs 404, processes the branch output 222 to generate augmented branch outputs 406, and processes the branch output 224 to generate augmented branch outputs 408.

The augmentation module 402 is configured to generate augmented branch outputs from a respective generator portion 202 branch output using any suitable augmentation technique. For example, in some implementations, the augmentation module 402 is configured to generate augmented branch outputs from a generator portion 202 branch output using the adaptive discriminator augmentations described by Karras, et. al in "Training generative adversarial networks with limited data," In NeurIPS, 2020, the disclosure of which is hereby incorporated by reference. When augmenting a generator branch output, the augmentation module 402 generates a plurality of outputs by applying random transformations to the branch output. For instance, when generating the augmented branch outputs 404, the augmentation module 402 applies a plurality of transformations to the branch output 220, such that the augmented branch outputs 404 includes a plurality of outputs, one for each of the plurality of transformations applied to the branch output 220. Augmented branch outputs generated by the augmentation module 402 are useful in avoiding overfitting the discriminator portion 226, thus stabilizing training.

During training, the augmented branch outputs generated by the augmentation module 402 are provided as input to the corresponding fidelity discriminator for the generator branch from which the branch output was augmented. For instance, the augmented branch outputs 404 are provided as input to the fidelity discriminator 228, the augmented branch outputs 406 are provided as input to the branch output 220, and the augmented branch outputs 408 are provided as input to the fidelity discriminator 232. The model training system 106 is further configured to concatenate the augmented branch outputs to generate concatenated outputs 410, which serves as input for training the consistency discriminator 234.

During training, each discriminator of the discriminator portion 226 is tasked with outputting a judgment regarding the corresponding input data. Specifically, the model training system 106 tasks each fidelity discriminator with outputting a judgment as to whether a branch output generated by a generator branch is real or fake. The model training system 106 tasks the consistency discriminator with outputting a judgment indicating whether the different branch outputs generated from a single input are visually consistent with one another (e.g., depict a similar environment or scene).

For instance, in the illustrated example of FIG. 4, the model training system 106 causes the fidelity discriminator 228 to output a judgment 412, for each of the augmented branch outputs 404, indicating whether the branch output is real or fake. To guide the respective discriminators in generating their judgments, the model training system 106 provides ground truth data 414 to the discriminator portion 226. The ground truth data 414 is representative of different training data for different discriminators of the discriminator portion 226 and in implementations specific types of data included in the ground truth data 414 is dependent on the various image modalities to be generated by the multi-branch GAN 108.

For instance, consider an example scenario where the branch output 220 represents an RGB image, branch output 222 represents a surface normal image, and branch output 224 represents a depth map image generated from the latent space code 110. In this example scenario, the multi-branch GAN 108 is being trained to generate images in three different modalities: RGB, surface normal, and depth map, and the ground truth data 414 similarly includes example training data pairs that demonstrate real-world RGB images, surface normal images, and depth map images for counterpart latent space codes. For instance, continuing this example scenario the ground truth data 414 includes a plurality of training pairs that each include a latent space code and a corresponding RGB image for the latent space code, a plurality of training pairs that each include a latent space code and a corresponding surface normal image for the latent space code, and a plurality of training pairs that each include a latent space code and a corresponding depth map image for the latent space code.

Training pairs for a given modality are provided to the respective discriminator so that the discriminator learns to differentiate between real and fake representations of the given modality. For instance, from the ground truth data 414 RGB training pairs are provided to the fidelity discriminator 228, surface normal training pairs are provided to the fidelity discriminator 230, and depth map training pairs are provided to the fidelity discriminator 232. Given these examples of real representations for their corresponding modality, the fidelity discriminators are caused to output a judgment indicating whether a generator branch output is "real or fake." For instance, in the illustrated example of FIG. 4, fidelity discriminator 228 generates a real/fake judgment 412 for each of the augmented branch outputs 404, fidelity discriminator 230 generates a real/fake judgment 416 for each of the augmented branch outputs 406, and fidelity discriminator 232 generates a real/fake judgment 420 for each of the augmented branch outputs 408.

In implementations, each of the judgment 412, judgment 416, and judgment 418 represents a numerical value between one and zero, where one represents a "real" judgment and zero represents a "fake" judgment. Architecturally, different fidelity discriminators included in the discriminator portion 226 are identical, except for an input layer. The input layer of each fidelity discriminator is responsible for transforming input data (e.g., a generator branch output) having a number of channels into a feature space of uniform dimensionality for the discriminator's modality. In this manner, the input layer of a fidelity discriminator implemented by the discriminator portion 226 is configured to transform a corresponding generator branch output into an appropriate number of channels for the modality upon which the fidelity discriminator is trained (e.g., three-channel input for RGB images, three-channel input for surface normal images, one-channel input for depth map images, and so forth).

For the consistency discriminator 234, the ground truth data 414 includes training sets of images depicting the same scene or environment, expressed in different modalities. For instance, continuing the example scenario from above, a training set of images for the consistency discriminator 234 includes a first image depicting an environment in an RGB format (e.g., the environment as would be observed by a human eye or captured by a camera), a second image depicting surface normal for the environment depicted in the first image, and a third image depicting a depth map for the environment depicted in the first and second images. Thus, the ground truth data 414 for the consistency discriminator 234 includes data that guides the consistency discriminator 234 to identify images of different modalities that depict visually similar content. Guided by this ground truth data 414, the consistency discriminator 234 is configured to generate a judgment 420 indicating whether the concatenated outputs 410 are visually consistent with one another. In implementations, the judgment 420 is a numerical value between one and zero, where one indicates that the concatenated outputs 410 each depict the same visual content (e.g., the same environment or scene) and zero indicates that the concatenated outputs 410 each depict different visual content.

During training of the multi-branch GAN 108, judgments output by each discriminator of the discriminator portion 226 are concatenated together and provided as input to a loss module 422 of the model training system 106. The loss module 422 is configured to generate a non-saturating GAN loss 424 based on an input generated from concatenating the judgments output by the discriminator portion 226. For instance, in the illustrated example of FIG. 4, the judgment 412, judgment 416, judgment 418, and judgment 420 are concatenated together and input to the loss module 422 to compute the non-saturating GAN loss 424. The non-saturating GAN loss 424 is a variation of the standard GAN loss function, where the generator portion 202 has an objective of maximizing the probabilities of discriminator portion 226 outputting judgments closer to one (e.g., judgments of "real" images for the fidelity discriminators and judgments of visual similarity for the consistency discriminator).

During training, the model training system 106 applies the non-saturating GAN loss 424 to both the generator portion 202 and the discriminator portion 226 to revise internal weights of at least one of the generator portion 202, one or more of the plurality of fidelity discriminators (e.g., at least one of the fidelity discriminator 228, the fidelity discriminator 230, or the fidelity discriminator 232), or the consistency discriminator 234 before processing another latent space code during a subsequent training iteration. The model training system 106 is configured to repeat these processes for any number of training iterations until the multi-branch GAN 108 converges. In implementations convergence of the multi-branch GAN 108 is achieved when judgements output by each of the fidelity discriminator 228, fidelity discriminator 230, fidelity discriminator 232, and consistency discriminator 234 are within a threshold difference from one. In some implementations, different threshold differences from one are assigned to different discriminators of the discriminator portion 226 to define multi-branch GAN 108 convergence. Upon achieving convergence, the multi-branch GAN 108 is output as a trained model for use by the image generation system 104.

Having considered example systems and techniques, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4.

FIG. 5 is a flow diagram depicting a procedure 500 in an example implementation of generating a plurality of different images from a single input using the multi-branch GAN 108 using the techniques described herein.

To begin, an input that includes a latent space code representing an image in an embedding space is received (block 502). The image generation system 104, for instance, receives latent space code 110. In some implementations, the latent space code 110 is received via user input at a computing device implementing the image generation system 104, such as via user input at computing device 102.

A plurality of different images are generated from the input using a GAN machine learning model (block 504). The image generation system 104, for instance, provides the latent space code 110 as input to the multi-branch GAN 108 and causes the multi-branch GAN 108 to generate a plurality of different images, where each of the plurality of images depicts similar visual content expressed in a different modality.

As part of generating the plurality of different images form the input, a plurality of shallow layers of a generator portion of the GAN machine learning model are caused to generate a shared output based on the input (block 506). The image generation system 104, for instance, causes a plurality of shallow layers 204 of the generator portion 202 of the multi-branch GAN 108 to generate a shared output 206.

As further part of generating the plurality of different images from the input, each of a plurality of different branches of the generator portion of the GAN machine learning model are caused to generate one of the plurality of different images based on the shared output (block 508). The shared output 206, for instance is provided as input to each of a plurality of branches of the generator portion 202, such as branch 208, branch 210, and branch 212. Each branch of the generator portion 202 is trained to generate an output image that depicts a similar scene or environment as depicted in output images generated by other branches of the generator portion 202, represented in a different modality. For instance, branch 208 generates branch output 220, branch 210 generates branch output 222, and branch 212 generates branch output 224.

The plurality of different images are then output (block 510). The image generation system 104, for instance, causes the multi-branch GAN 108 to output branch output 220 as image 236, output branch output 222 as image 238, and output branch output 224 as image 240. In an example implementation, image 236 is a RGB image of an environment generated from the latent space code 110, image 238 is a surface normal image of the environment depicted in image 236 generated from the latent space code 110, and image 240 is a depth map image of the environment depicted in image 236 and image 238, generated from the latent space code 110.

FIG. 6 is a flow diagram depicting a procedure 600 in an example implementation of training a multi-branch GAN and using the trained multi-branch GAN to generate a plurality of different modality images from a single input using the techniques described herein. To begin, a trained GAN machine learning model configured to output a plurality of different modality images from a single input is generated (block 602). The model training system 106, for instance, trains the multi-branch GAN 108 to generate a plurality of different images that each represent a different modality of common visual content (e.g., different modality images of the same scene or environment).

As part of training the multi-branch GAN 108, the model training system 106 causes each of a plurality of branches of a generator portion of the GAN machine learning model to generate a different image from a training input (block 604). The model training system 106, for instance, provides a training latent space code as input to the generator portion 202 of the multi-branch GAN 108 and causes each branch of the generator portion 202 to generate a branch output. For instance, the model training system 106 causes the branch 208 to generate branch output 220, the branch 210 to generate branch output 222, and the branch 212 to generate the branch output 224 for the training latent space code. In some implementations, the model training system 106 augments the outputs of each generator portion 202 branch. For instance, the augmentation module 402 generates augmented branch outputs 404 from the branch output 220, generates augmented branch outputs 406 from the branch output 222, and generates augmented branch outputs 408 from the branch output 224.

As further part of training the multi-branch GAN 108, the model training system 106 causes, for each of the plurality of different branches of the generator portion, a corresponding one of a plurality of fidelity discriminators of the GAN machine learning model to output a judgment indicating whether the branch output is visually realistic (block 606). The model training system 106, for instance, causes the fidelity discriminator 228 to output a judgment 412 for each of the augmented branch outputs 404, causes the fidelity discriminator 230 to output a judgment 416 for each of the augmented branch outputs 406, and causes the fidelity discriminator 232 to output a judgment 418 for each of the augmented branch outputs 408.

As further part of training the multi-branch GAN 108, the model training system 106 causes a consistency discriminator of the GAN machine learning model to output a judgment indicating whether the plurality of different branch outputs are visually similar to one another (block 608). The model training system 106, for instance, concatenates the outputs generated by the generator portion 202 (e.g., the augmented branch outputs 404, the augmented branch outputs 406, and the augmented branch outputs 408) to generate concatenated outputs 410. The consistency discriminator 234 is then tasked with generating a judgment 420 as to whether the concatenated outputs 410 represent images that are visually similar to one another (e.g., depict a common scene or environment).

As further part of training the multi-branch GAN 108, a loss function is computed based on judgments output by the plurality of fidelity discriminators and the consistency discriminator (block 610). The model training system 106, for instance, causes the loss module 422 to generate a non-saturating GAN loss 424 based on each judgment 412, each judgment 416, each judgment 418, and the judgment 420 generated for the training latent space code. At least one internal weight of the GAN machine learning model is then updated based on the loss function (block 612). The model training system 106, for instance, updates one or more internal weights of at least one branch of the generator portion 202, at least one fidelity discriminator of the discriminator portion 226, the consistency discriminator of the discriminator portion 226, or combinations thereof, by applying the non-saturating GAN loss 424 to the generator portion 202 and the discriminator portion 226.

The model training system 106 is configured to repeat the operations described in block 604, block 606, block 608, block 610, and block 612 for any number of training iterations. For instance, in some implementations the model training system 106 performs the operations described in block 604, block 606, block 608, block 610, and block 612 for each of a plurality of training iterations until the multi-branch GAN 108 converges.

After generating the trained GAN machine learning model, a plurality of different modality images are generated from a latent space code using the trained GAN machine learning model (block 614). The image generation system 104, for instance, generates image 112, image 114, and image 116 from the latent space code 110 using the multi-branch GAN 108 in accordance with the procedures described above with respect to FIG. 5.

Having described example procedures in accordance with one or more implementations, consider now an example system and device to implement the various techniques described herein.

Example System and Device

FIG. 7 illustrates an example system 700 that includes an example computing device 702, which is representative of one or more computing systems and/or devices that implement the various techniques described herein. This is illustrated through inclusion of the image generation system 104 and the model training system 106. The computing device 702 is configured, for example, as a service provider server, as a device associated with a client (e.g., a client device), as an on-chip system, and/or as any other suitable computing device or computing system.

The example computing device 702 as illustrated includes a processing system 704, one or more computer-readable media 706, and one or more I/O interface 708 that are communicatively coupled, one to another. Although not shown, the computing device 702 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that are configurable as processors, functional blocks, and so forth. For instance, hardware element 710 is implemented in hardware as an application specific integrated circuit or other logic device formed using one or more semiconductors. The hardware elements 710 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 706 is illustrated as including memory/storage 712. The memory/storage 712 represents memory/storage capacity associated with one or more computer-readable media. The memory/storage 712 is representative of volatile media (such as random-access memory (RAM)) and/or nonvolatile media (such as read only memory (ROM), Flash memory, optical disks, magnetic disks, and so forth). The memory/storage 712 is configured to include fixed media (e.g., RAM, ROM, a fixed hard drive, and so on) as well as removable media (e.g., Flash memory, a removable hard drive, an optical disc, and so forth). In certain implementations, the computer-readable media 706 is configured in a variety of other ways as further described below.

Input/output interface(s) 708 are representative of functionality to allow a user to enter commands and information to computing device 702 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 702, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 710. The computing device 702 is configured to implement instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supported by various configurations of the computing device 702 and are not limited to the specific examples of the techniques described herein. This functionality is further configured to be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that is utilized while computer processing is executed on servers that are remote from the computing device 702. Resources 718 also include services provided over the Internet and/or through a subscriber network, such as a cellular or Wi-Fi network.

The platform 716 is configured to abstract resources and functions to connect the computing device 702 with other computing devices. The platform 716 is further configured to abstract scaling of resources to provide a corresponding level of scale to encountered demand for the resources 718 that are implemented via the platform 716. Accordingly, in an interconnected device embodiment, implementation of functionality described herein is configured for distribution throughout the system 700. For example, in some configurations the functionality is implemented in part on the computing device 702 as well as via the platform 716 that abstracts the functionality of the cloud 714.

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A system comprising:

a generator portion of a generative adversarial network (GAN) machine learning model that includes a plurality of branches that are each configured to generate a different image from a single input; and a discriminator portion of the GAN machine learning model that includes:

a plurality of fidelity discriminators, each of the plurality of fidelity discriminators corresponding to a respective one of the plurality of branches of the generator portion; and a consistency discriminator configured to receive concatenated outputs from the plurality of branches of the generator portion and ensure, based on the concatenated outputs, that the different images generated by the plurality of branches of the generator portion are visually similar.

2. The system of claim 1, wherein the generator portion includes a plurality of shallow layers, each of the plurality of shallow layers configured to process the single input and generate a shared output that is provided as an input to each of the plurality of branches.

3. The system of claim 1, wherein each of the plurality of branches include a plurality of deep generator layers that are configured to generate a feature map and a convolutional layer configured to generate an image from the feature map according to a modality associated with the branch of the generator portion.

4. The system of claim 3, wherein the plurality of deep generator layers for one of the plurality of branches shares a common structure with the plurality of deep generator layers for others of the plurality of branches.

5. The system of claim 1, wherein the plurality of branches include:

a first branch configured to generate a red, green, blue (RGB) image from the single input;

a second branch configured to generate a segmentation map image from the single input;

a third branch configured to generate a depth map image from the single input; and a fourth branch configured to generate a surface normal image from the single input.

6. The system of claim 1, wherein each of the plurality of fidelity discriminators is trained to output a judgment indicating whether an image generated by a corresponding one of the plurality of branches of the generator portion is visually realistic.

7. The system of claim 1, wherein internal weights of the generator portion, each of the plurality of fidelity discriminators, and the consistency discriminator are trained using a non-saturating GAN loss computed during training of the GAN machine learning model.

8. A method comprising:

generating, by a processing device, a plurality of different images from a single input using a generative adversarial network (GAN) machine learning model that includes a generator portion and a discriminator portion by:

causing each of a plurality of different branches of the generator portion to generate one of the plurality of different images; and causing a consistency discriminator of the discriminator portion to ensure that the plurality of different images are visually similar to one another by processing concatenated outputs from the plurality of different branches of the generator portion.

9. The method of claim 8, wherein each of the plurality of different images depicts a common scene or environment expressed in a modality that is different from other ones of the plurality of different images.

10. The method of claim 9, wherein the modality comprises one of a red, green, blue (RGB) image, a segmentation map image, a depth map image, or a surface normal image.

11. The method of claim 8, wherein generating the plurality of different images from the single input comprises generating a shared output by processing the single input using a plurality of shallow layers of the generator portion and inputting the shared output to each of the plurality of different branches, wherein each of the plurality of different branches include deep layers of the generator portion.

12. The method of claim 8, wherein generating the plurality of different images from the single input further comprises causing, for each of the plurality of different branches of the generator portion, a fidelity discriminator in the discriminator portion to output a judgment indicating whether an output of the branch of the generator portion is realistic.

13. The method of claim 8, wherein generating the plurality of different images from the single input comprises generating modulation parameters by processing the single input using a mapping network and providing the modulation parameters as input to each layer of the generator portion of the GAN machine learning model.

14. The method of claim 8, wherein the single input comprises a latent space code.

15. The method of claim 14, further comprising determining the latent space code based on an input image, wherein the plurality of different images comprise two or more of a segmentation map image, a depth map image, or a surface normal image for the input image.

16. The method of claim 8, further comprising training the GAN machine learning model by:

causing the plurality of different branches of the generator portion to output a plurality of different training images from a training input;

causing, for each of the plurality of different branches of the generator portion, a corresponding one of a plurality of fidelity discriminators of the discriminator portion to output a judgment indicating whether the branch of the generator portion output a visually realistic training image;

causing the consistency discriminator to output a judgment indicating whether the plurality of different training images are visually similar to one another;

computing a loss function based on judgments output by the plurality of fidelity discriminators and the consistency discriminator; and updating at least one internal weight of the GAN machine learning model using the loss function.

17. A method comprising:

generating, by a processing device, a trained generative adversarial network (GAN) machine learning model to output a plurality of different images from a single input by:

causing each of a plurality of different branches of a generator portion of the GAN machine learning model to generate a different image from the single input;

causing, for each of the plurality of different branches of the generator portion, a corresponding one of a plurality of fidelity discriminators of the GAN machine learning model to output a judgment indicating whether the branch of the generator portion output a visually realistic image;

causing a consistency discriminator of the GAN machine learning model to output a judgment indicating whether the plurality of different images are visually similar to one another by processing concatenated outputs from the plurality of different branches of the generator portion;

computing a loss function based on judgments output by the plurality of fidelity discriminators and the consistency discriminator; and updating at least one internal weight of the GAN machine learning model based on the loss function.

18. The method of claim 17, wherein each of the plurality of different images expresses visual content using a different modality.

19. The method of claim 18, wherein the different modality expressed by one of the plurality of different images includes a red, green, blue (RGB) image and the different modality expressed by another one of the plurality of different images includes a depth map image, a segmentation map image, or a surface normal image.

20. The method of claim 17, wherein computing the loss function comprises computing a non-saturating GAN loss based on the judgments output by the plurality of fidelity discriminators and the consistency discriminator.

* * * * *